United States Patent
Kamada et al.

(10) Patent No.: US 7,031,049 B2
(45) Date of Patent: Apr. 18, 2006

(54) LOSS POINT DETECTING METHOD AND DISTRIBUTED RAMAN AMPLIFIER APPLYING THE SAME

(75) Inventors: Takashi Kamada, Kawasaki (JP); Motoyoshi Sekiya, Kawasaki (JP); Ryosuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 10/699,698

(22) Filed: Nov. 4, 2003

(65) Prior Publication Data

US 2004/0090663 A1 May 13, 2004

(30) Foreign Application Priority Data

Nov. 6, 2002 (JP) .............................. 2002-322574

(51) Int. Cl.
*H01S 3/00* (2006.01)
*H04B 10/12* (2006.01)
*H04B 10/08* (2006.01)
*H04B 17/00* (2006.01)

(52) U.S. Cl. .................. 359/334; 359/341.44; 398/13; 398/14; 398/15; 398/21

(58) Field of Classification Search ............ 359/341.1, 359/341.44, 334; 398/10, 11, 17, 18, 21, 398/13, 14, 15
See application file for complete search history.

(56) References Cited

U.S. PATENT DOCUMENTS

| 5,673,108 | A * | 9/1997 | Takeuchi .................... 356/73.1 |
| 5,963,362 | A * | 10/1999 | Fukaishi ................ 359/341.44 |
| 6,462,861 | B1 * | 10/2002 | Ohshima et al. ............ 359/334 |
| 6,674,518 | B1 * | 1/2004 | Asher et al. ................ 356/73.1 |
| 6,674,567 | B1 * | 1/2004 | Ohtani et al. ................ 359/334 |
| 2004/0196158 | A1 * | 10/2004 | Sugaya et al. ........... 340/815.4 |

FOREIGN PATENT DOCUMENTS

| JP | 2000-314902 | 11/2000 |
| JP | 2001-185787 | 7/2001 |

* cited by examiner

*Primary Examiner*—Mark Hellner
*Assistant Examiner*—Ari M. Diacou
(74) *Attorney, Agent, or Firm*—Staas & Halsey LLP

(57) ABSTRACT

Power of scattered light separated from an optical transmission path is monitored, part of the excitation light is separated and power thereof is monitored, power of reflected light which passes in a direction opposite to a direction in which signal light passes through the optical transmission path is monitored, and, when monitored power of an excitation light reaches a predetermined determination value, whether or not any loss point occurs is determined, based on a ratio between the monitored power of the scattered light and the monitored power of the reflected light.

12 Claims, 12 Drawing Sheets

LOSS POINT DETECTING METHOD AND DISTRIBUTED RAMAN AMPLIFIER APPLYING THE SAME

BACKGROUND OF THE INVENTION

1. Field of the Invention

The present invention relates to a loss point detecting method and a distributed Raman amplifier applying the same, and, in particular, to a loss point detecting method used in an optical system and a distributed Raman amplifier applying the same.

2. Description of the Related Art

Recently, a demand for communications rapidly increases in many countries along with a sharp spreading of the Internet or a development of multimedia society. For the purpose of catching up therewith, introduction of a backbone optical transmission system applying a WDM (wavelength division multiplexer) technology has been proceeded with, whereby increase in the transmission capacity is directed to.

In order to increase the transmission capacity, various methods such as time-division multiplexing, wavelength division multiplexing and so forth are considered, and, in particular, the method of wavelength division multiplexing is expected as being applied for the purpose of further increasing the transmission capacity with a seek for wider-band wavelength and a study concerning wavelength separation. However, in case of applying the technology for a use of long-distance transmission, an optical signal is attenuated there, and, thus, repeating or amplifying thereof is needed on the way.

There are two types of methods for amplifying an optical signal in an optical transmission path, i.e., of a stimulated emission type and of a Raman scattering type, and a distributed Raman amplifier (DRA) which applies the Raman scattering type amplification has been taken into a practical use widely in that it is possible to freely select the amplifying wavelength.

A WDM optical transmission system has a transmission station which generates a wavelength-multiplexed signal light, an optical transmission path transmitting the signal light generated by the transmission station, and a reception station which receives the signal light thus transmitted. Further, as needed, repeaters amplifying the signal light may be provided in the optical transmission path.

FIG. 1 illustrates a distributed Raman amplifier in the related art used in such a WDM optical transmission system (see Japanese laid-open patent application No. 2000-314902, for example). In the configuration shown, a signal light having the wavelength of 1.55 µm, for example, is transmitted through an optical fiber 10. This signal light is applied to a band separation optical coupler 12. Also, to the band separation optical coupler 12, an excitation light with the wavelength of 1.45 µm is supplied from an excitation light source 14 via an optical coupler 16. The signal light amplified optically with the supply of the excitation light is then sent out to a subsequent optical fiber via an optical coupler 18.

In the optical coupler 16, the excitation light from the excitation light source 14 is separated, and the power of the excitation light is monitored by an excitation light monitor 20, and the thus-obtained monitoring signal of the power of the excitation light is supplied to a control circuit 22. The signal light separated by the optical coupler 18 is monitored by a signal light monitor 24, and the thus-obtained monitoring signal of the power of the signal light is supplied to the control circuit 22. The control circuit 22 adjusts the excitation light power which the excitation light source 14 originally outputs according to the thus-obtained respective monitoring signals of the excitation light power and signal light power.

The distributed Raman amplifier (DRA) can perform amplification in an arbitrary wavelength zone, by appropriately setting the wavelength of the excitation light, and also, is advantageous in that the optical amplifying medium can be used also as the optical transmission path. Assuming that 'go' denotes the Raman gain factor, Pi denotes the applied excitation light power, Aeff denotes the nonlinear effective cross-sectional area, and Le denotes the DRA effective length, generally, the DRA gain Gr is expressed by the following formula (1), and the DRA effective length Le is expressed by the following formula (2);

$$Gr = exp[(goPiLe)/(2Aeff)] \tag{1}$$

$$Le = \int_0^L P(z)/Pi\, dz \tag{2}$$

There, $$P(z) = Pi \cdot exp[-\alpha(L-z)]$$

There, α denotes a constant, and 'z' denotes a relevant position along the optical fiber 10 assuming that L denotes the position of the band separation optical coupler 12.

SUMMARY OF THE INVENTION

An optical loss occurs due to some cause such as a junction of the optical fiber 10 performed in a poor manner or so. A point at which such an optical loss occurs is referred to as a loss point, hereinafter. When such a loss point occurs near the DRA (distributed Raman amplifier), the gain Gr of the DRA becomes greatly lowered as can be seen from the above-mentioned formulas (1) and (2).

FIG. 2 shows a calculation result of the above-mentioned DRA gain Gr assuming that the Raman gain factor 'go' is $6.7 \times 10^{-14}$ [m/W], the applied excitation light power Pi is 1.6 [W], the nonlinear effective cross-sectional area Aeff is 102 [µm²], the length of the optical fiber transmission path is 100 [km], and the loss occurring at the loss point is 0 [dB], 1 [dB], 2 [dB], and 3 [dB].

The applied excitation power is controlled according to the monitoring result of the signal light power. Accordingly, when the DRA gain is small due to the existence of the loss point, the applied excitation light power is increased automatically as large as possible up to the maximum value of the excitation light power in some case in order to obtain a necessary signal light power as shown in FIG. 3. At the loss point, a rate at which the energy of light is transformed into thermal energy is large compared with another point in the optical fiber 10. Accordingly, when the excitation light reaches the loss point while the optical energy thereof is high, burning out of the fiber material may occur there accordingly.

According to the distributed Raman amplifier in the related art, as shown in FIG. 1, the amplified signal is separated by the optical coupler 18, the light power is monitored after that, and, therewith, the excitation power adjustment control is performed. However, in case the loss point occurs in the optical transmission path, a sufficient gain may not be obtained even when the excitation light power is increased accordingly.

Therefore, as shown in FIG. 3, the excitation light power is increased for obtaining a necessary signal light power, and, as a result, the optical transmission path material may be burned out at the loss point as mentioned above in a worse case.

The present invention has been devised for the purpose of solving this problem, and, an object of the present invention is to provide a loss point detecting method for determining whether any loss point occurs for the purpose of avoiding a problematic situation such as a burning out of the optical transmission path material as mentioned above, and a distributed Raman amplifier which applies this method.

According to a first aspect of the present invention, a scattered light separated from the optical transmission path is monitored, a part of the excitation light is separated and is monitored, a reflected light which passes in a direction opposite to the direction in which the signal light passes through the optical transmission path is monitored, and, when the power of the excitation light monitored reaches a predetermined determination value, it is determined whether or not any loss point occurs based on a ratio between the power of the scattered light monitored and the power of the reflected light monitored.

According to a second aspect of the present invention, the scattered light separated from the optical transmission path is monitored, a part of the excitation light is separated and is monitored, and, when the power of the excitation light monitored reaches a predetermined determination value, it is determined whether or not any loss point occurs based on the power of the scattered light monitored.

According to a third aspect of the present invention, a scattered-light monitoring part monitoring a scattered light separating from the optical transmission path; an excitation-light monitoring part separating a part of the excitation light and monitoring it; a reflected-light monitoring part separating a reflected light which passes in a direction opposite to the direction in which the signal light passes through the optical transmission path, and monitoring it; a determining part determining, when the power of the excitation light monitored reaches a predetermined determination value, whether or not any loss point occurs based on a ratio between the power of the scattered light monitored and the power of the reflected light monitored; and a breaking part breaking the excitation light when the determining part determines that a loss point occurs are provided. Thereby, it is possible to avoid burning out of the optical transmission path material at the loss point if any.

According to a fourth aspect of the present invention, a scattered-light monitoring part monitoring a scattered light separating from the optical transmission path; an excitation-light monitoring part separating a part of the excitation light and monitoring it; a reflected-light monitoring part separating a reflected light which passes in a direction opposite to the direction in which the signal light passes through the optical transmission path, and monitoring it; a determining part determining whether or not any loss point occurs, by increasing the power of the excitation light at a fixed rate, and comparing a time required for the power of the scattered light monitored to reach a fixed value with a time required for the power of the reflected light monitored to reach a fixed value; and a breaking part breaking the excitation light when said determining part determines that a loss point occurs are provided. Thereby, it is possible to avoid burning out of the optical transmission path material at the loss point if any.

According to a fifth aspect of the present invention, a scattered-light monitoring part monitoring a scattered light separating from the optical transmission path; an excitation-light monitoring part separating a part of the excitation light and monitoring it; a determining part determining, when the power of the excitation light monitored reaches a predetermined determination value, whether or not any loss point occurs based on the power of the scattered light monitored; and a breaking part breaking the excitation light when the determining part determines that a loss point occurs are provided. Thereby, it is possible to avoid burning out of the optical transmission path material at the loss point if any.

PREFERRED EMBODIMENT OF THE PRESENT INVENTION

Embodiments of the present invention will now be descried with reference to figures.

Figure 1:
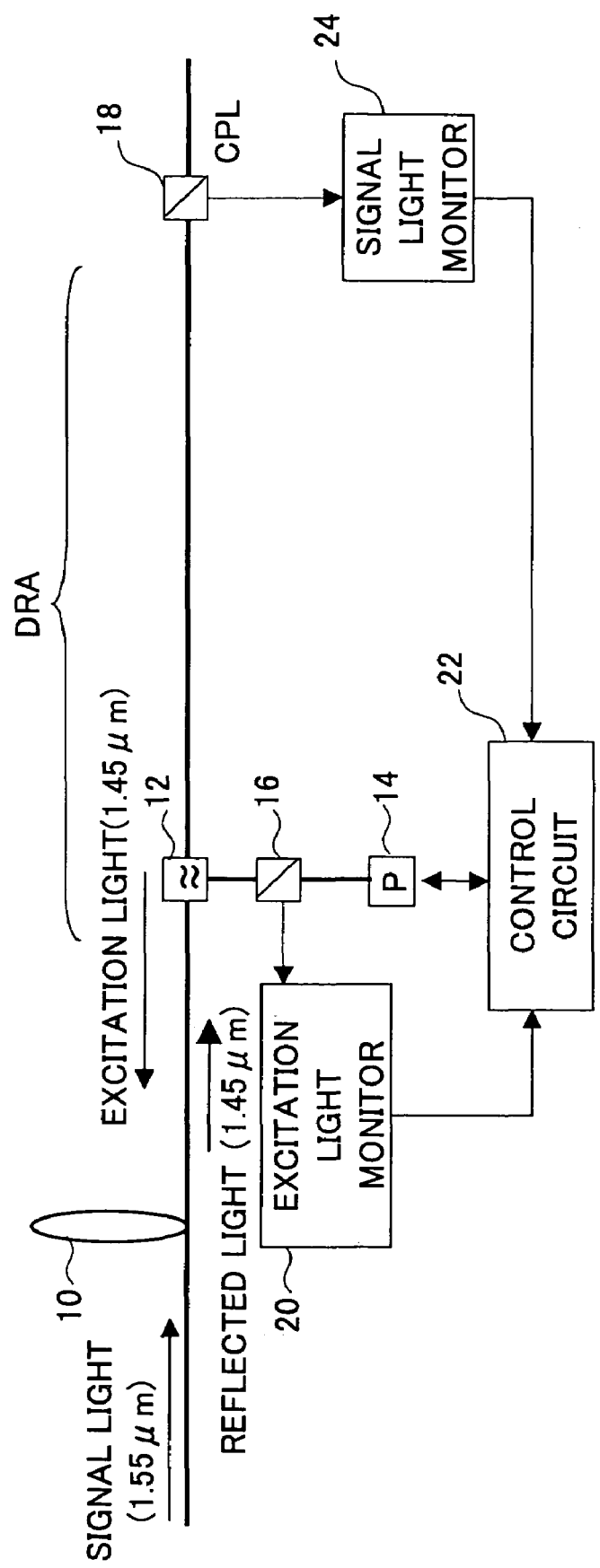
FIG. 1 shows a block diagram of an example of a distributed Raman amplifier in the related art.
Figure 2:
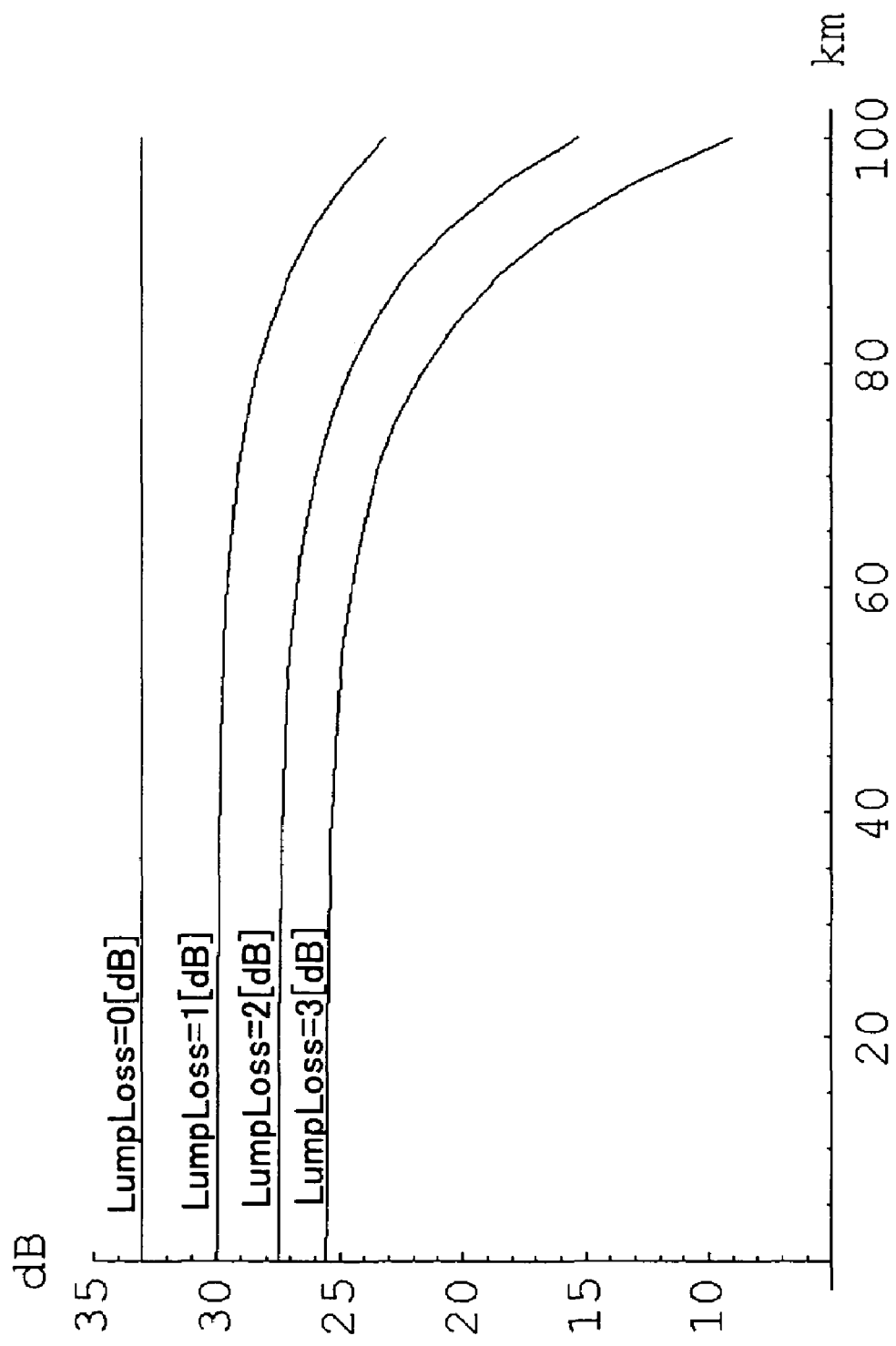
FIG. 2 shows a calculation result of a DRA gain obtained with respect to various values in the loss occurring at a loss point and various value in the position of the loss point.
Figure 3:
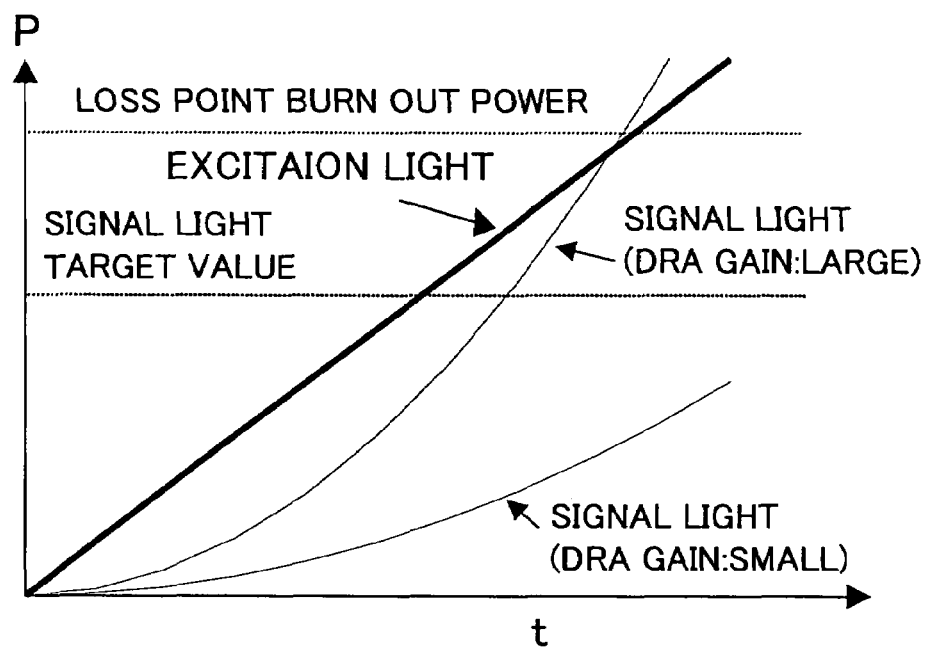
FIG. 3 illustrates an excitation light feedback control scheme.
Figure 4:
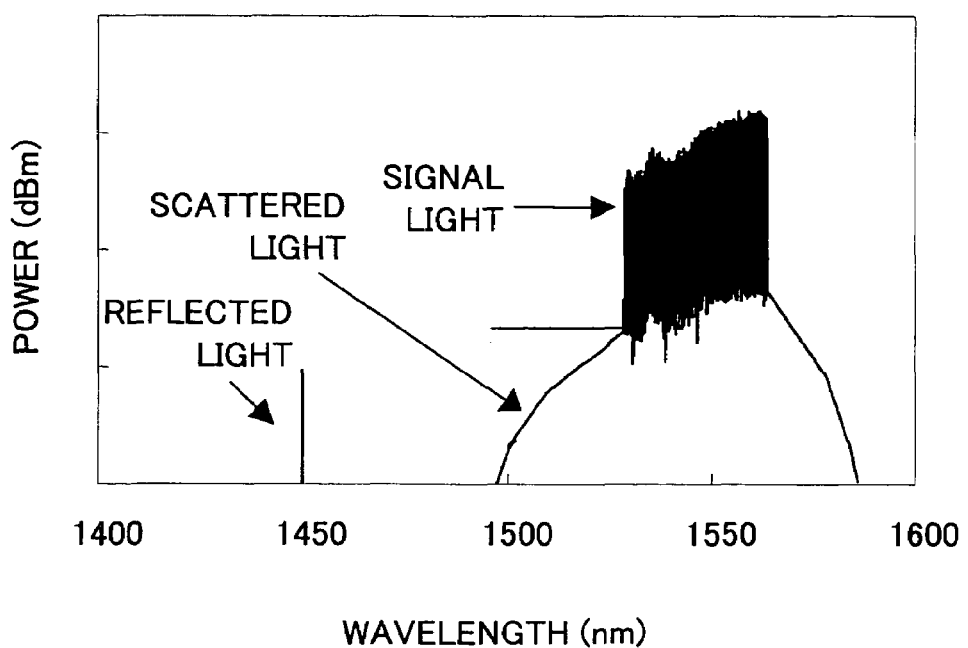
FIG. 4 illustrates wavelength spectra of a signal light, a scattered light, and a reflected light.

When an excitation light is applied to an optical fiber transmission path, a scattered light and a reflected light occur other than a signal light thus amplified, as shown in FIG. 4. And when a loss point occurs in the optical fiber transmission path as mentioned above, the scattered light power ASS is small while the reflected light power Pm is large. When no loss point occurs, contrary, the scattered light power is large while the reflected light power is small.

Accordingly, a first embodiment of the present invention performs control of the excitation light power by monitoring the scattered light power and the reflected light power, and then based on the thus-monitored powers.

Figure 5:
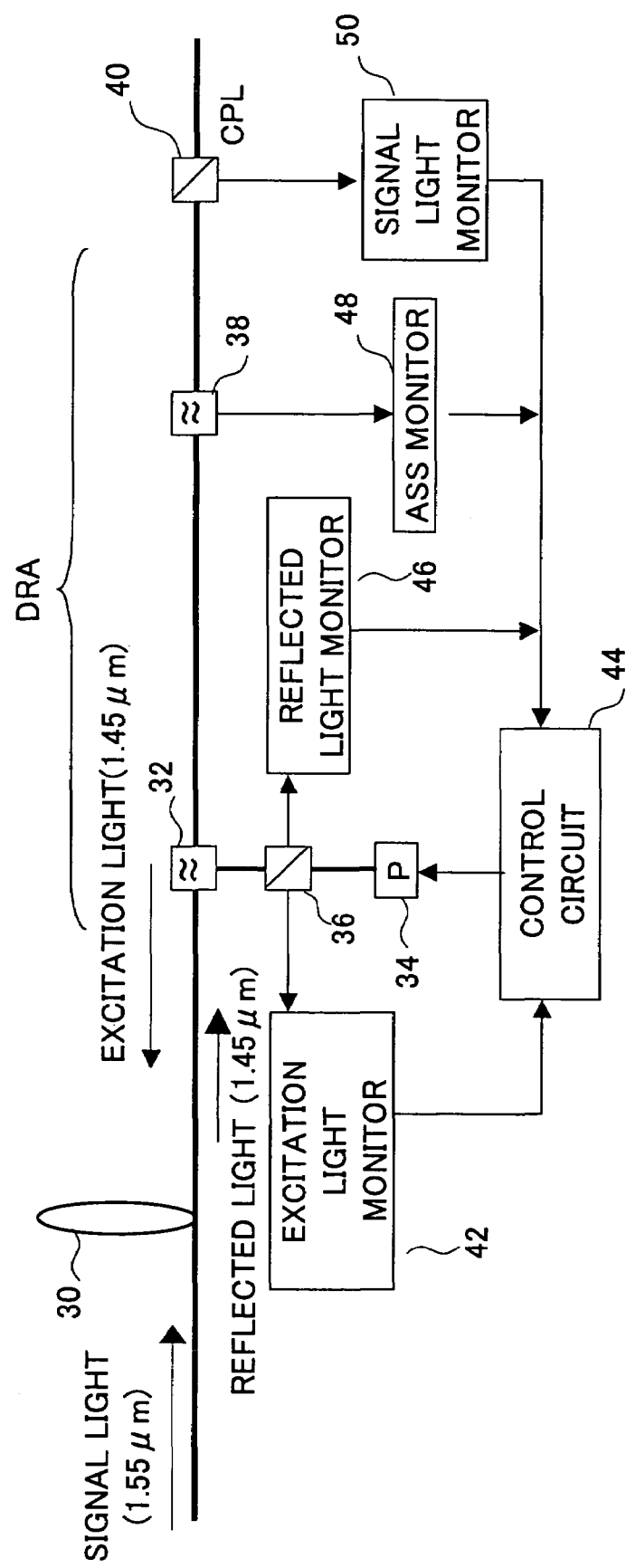
FIG. 5 shows a block diagram of a distributed Raman amplifier according to a first embodiment of the present invention.

FIG. 5 shows a block diagram of a distributed Raman amplifier in the first embodiment of the present invention. As shown, a signal light for example with the wavelength of 1.55 μm is transmitted through an optical fiber 30 which is an optical transmission path. This signal light is applied to a band separation optical coupler 32. An excitation light with the wavelength of 1.45 μm is supplied also to the band separation optical coupler 32 through an optical coupler 36 from an excitation light source 34, and, in the band separation optical coupler 32, the excitation light is applied to the optical fiber 30 in a direction opposite to a transmission direction of the signal light.

Thereby, the signal light is amplified with a use of the optical fiber 30 as an amplifying medium. The signal light thus optically amplified with the supply of the excitation light is sent out to a subsequent optical fiber via a band separation optical coupler 38 and an optical coupler 40.

In the optical coupler 36, while the excitation light supplied from the excitation light source 34 is separated, a reflected light in a direction opposite to that of the excitation light obtained from the band separation optical coupler 32 is also separated. The power of the excitation light is monitored by the excitation light monitor 42, and the thus-obtained monitoring signal is supplied to a control circuit 44, while the power of the reflected light is monitored by the reflected light monitor 46, and the thus-obtained monitoring signal is also supplied to the control circuit 44.

Moreover, a scattered light separated with the band separation optical coupler 38 is monitored by a scattered light monitor 48, and the thus-obtained monitoring signal of the scattered light power is supplied to the control circuit 44. The signal light separated with the optical coupler 40 is monitored by the signal light monitor 50, and the thus-obtained monitoring signal of the signal light power is supplied to the control circuit 44.

The control circuit 44 adjusts the excitation light power which the excitation light source 34 originally outputs, according to the thus-supplied respective monitoring signals of the excitation light power, reflected light power, scattered light power, and signal light power. Upon operation of the device, i.e., DRA, the control circuit 44 raises the excitation light power at a fixed rate from 0, with monitoring the scattered light power and the reflected light power.

Figure 6:
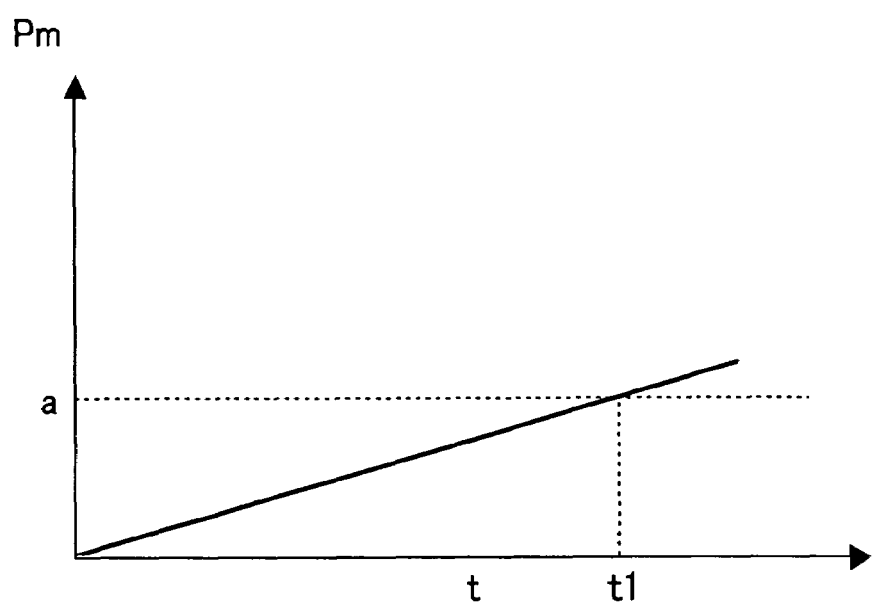
FIG. 6 illustrates a reflected light power changing as the excitation light power is increased at a fixed rate.
Figure 7:
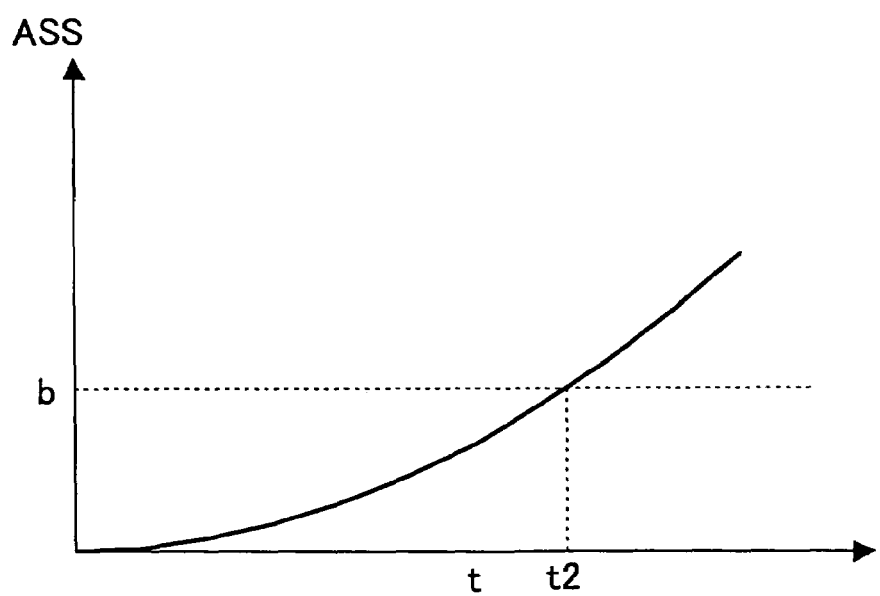
FIG. 7 illustrates a scattered light power changing as the excitation light power is increased at a fixed rate.

At this time, the reflected light power Pm increases gradually linearly, as shown with a solid line shown in FIG. 6. Moreover, the scattered light power ASS also increases gradually with a curve shape, as shown with a solid line shown in FIG. 7. A time when the reflected light power arrives at a predetermined reference point 'a' is assumed as 't1', and a time at which the scattered light power arrives at a predetermined reference point 'b' is assumed as 't2'.

The above-mentioned reference points 'a' and 'b' are determined by the following manner: First, the greatest excitation light power with which the optical fiber 30 of the optical transmission path is not burned out even with a loss point occurring is determined. Then, the position and the loss amount (dB) of the loss point with which the DRA gain can have the necessary lowest value which system requires within the thus-determined excitation power are found out. Then, in these conditions, the scattered light power ASS and reflected light power Pm are monitored. The thus-obtained values of the scattered light power ASS and the reflected light power are determined as the reference points 'b' and 'a'.

Figure 8:
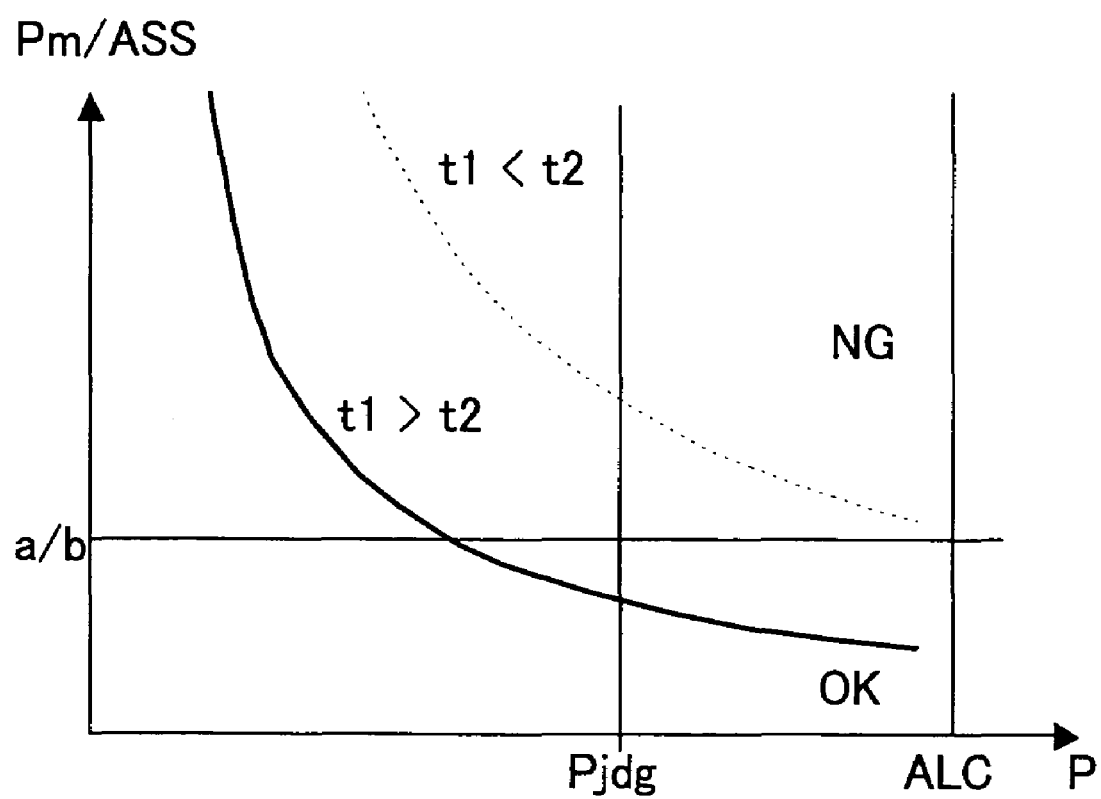
FIG. 8 illustrates a relation of the scattered light power ASS and the reflected light power Pm with respect to the applied excitation light power P.

FIG. 8 shows relations of the scattered light power ASS and the reflected light power Pm with respect to the applied excitation light power P. The excitation light power is raised at a fixed rate, and a time when the excitation light power reaches a determination value Pjdg is assumed as tjdg. A dashed line shown denotes the characteristic of the optical transmission path with a loss point, and when the excitation light power reaches the determination value Pjdg, Pm/ASS still exceeds a/b as shown. A solid line shown denotes the characteristic of the optical transmission path without a loss point, and in this case, when the excitation light power reaches Pjdg, Pm/ASS already becomes lower than a/b.

The control circuit 44 determines that a loss point occurs in case the value Pm/Ass still exceeds the value a/b when the excitation light power P reaches the determination value Pjdg, and then, turns off the excitation light, and for example, generates an alarm signal for a host apparatus. On the other hand, in case the value Pm/Ass is already lower than the value a/b when the excitation light power P reaches the determination value Pjdg, the control circuit 44 determines that no loss point occurs, and then, executes a control of maintaining the excitation light power at a fixed value.

Figure 9:
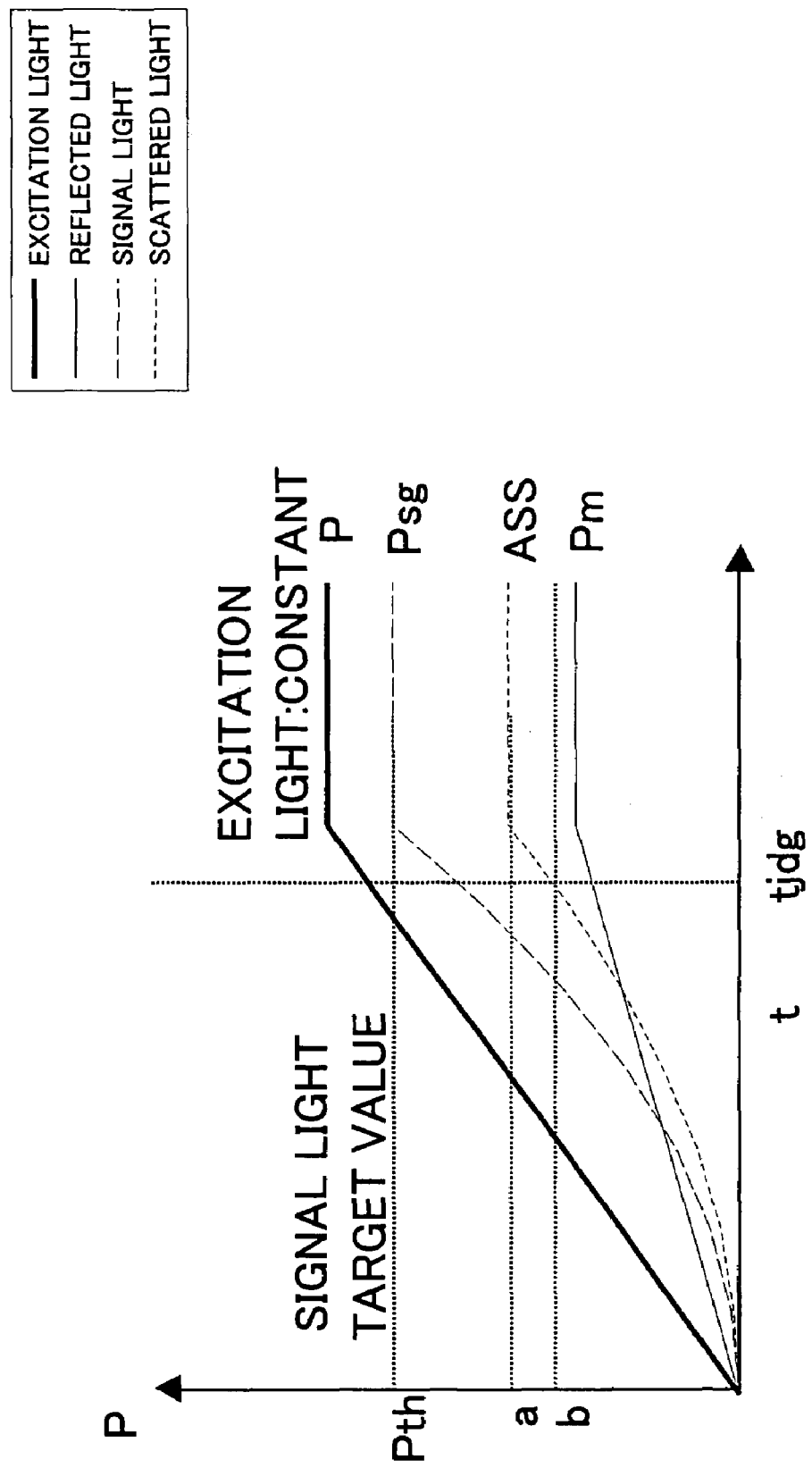
FIG. 9 illustrates respective changes of the excitation light power P, the reflected light power Pm, the scattered light power ASS, and the signal light power Psg in case no loss point occurs.

In detail, FIG. 9 shows, for a case where there is no loss point (t1>t2), respective changes of the excitation light power P, the reflected light power Pm, the scattered light power ASS, and the signal light power Psg. On the other hand, FIG. 10 shows, for a case where there is a loss point (t1<t2), respective changes of the excitation light power P, the reflected light power Pm, the scattered light power ASS, and the signal light power Psg.

Figure 10:
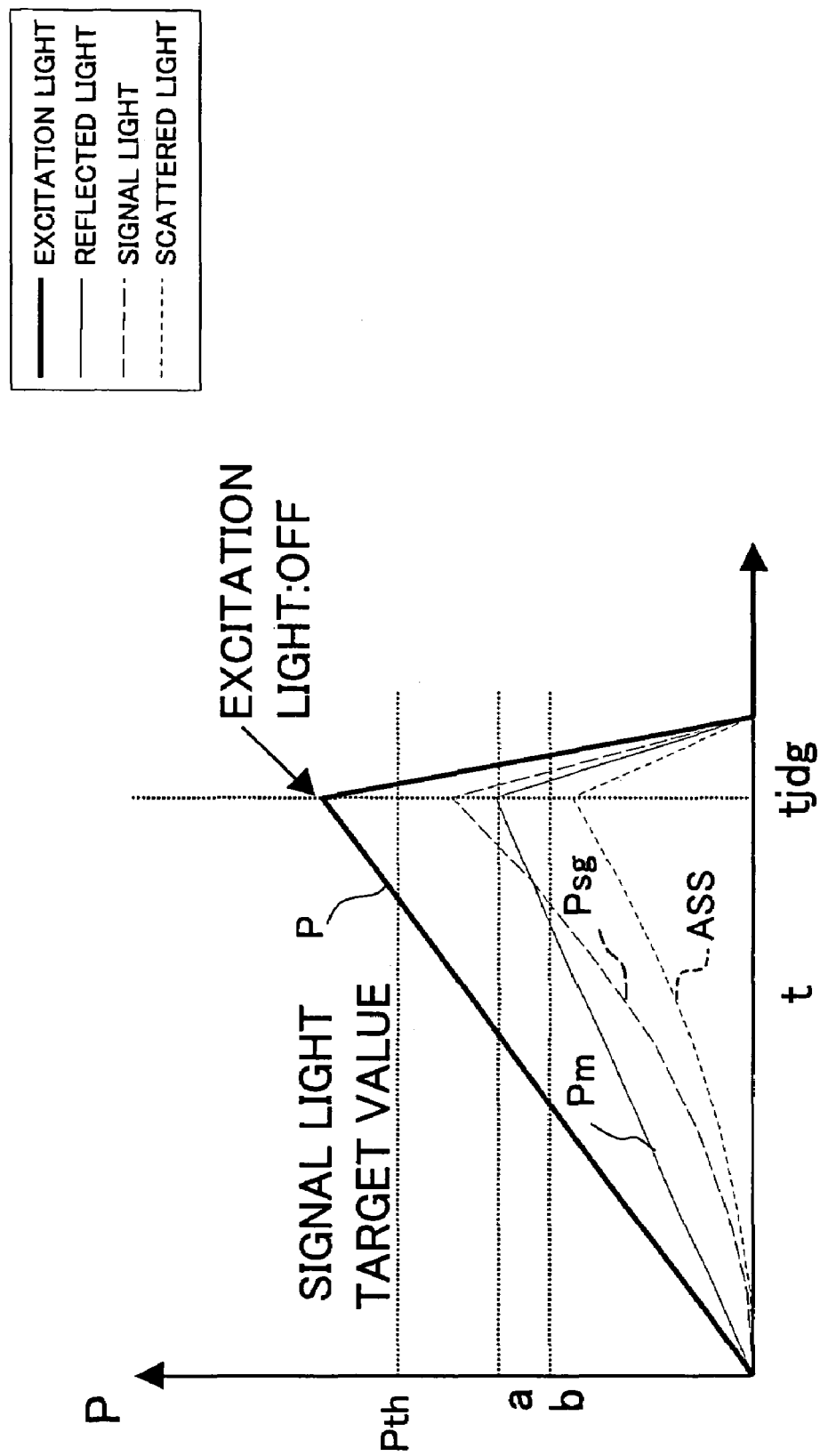
FIG. 10 illustrates respective changes of the excitation light power P, the reflected light power Pm, the scattered light power ASS, and the signal light power Psg in case a loss point occurs.

In actual control scheme in the first embodiment, as shown in FIGS. 9 and 10, first, the control circuit 44 raises the excitation light power P at a fixed rate until the signal light power Psg reaches a target value Pth at a necessary level.

In the case shown in FIG. 10, in which, as a loss point occurs (t1<t2), the reflected light power Pm arrives at the reference point 'a' before the scattered light power ASS arrives at the reference point 'b' while the excitation light power P is raised at the fixed rate as mentioned above. The control circuit 44 then performs control of breaking the excitation light power P, before the signal light power Psg reaches the target value Pth, as determining that a loss point occurs in the optical transmission path and thus burning out might occur if the excitation light power were raised more.

On the other hand, in case where there is no loss point or it can be ignored even a loss point occurs (t1>t2), the scattered light power ASS arrives at the reference point 'b' before the reflected light power Pm arrives at the reference point 'a' as shown in FIG. 9 while the excitation light power P is raised at the fixed rate. Accordingly, the control circuit 44 performs a control of raising the excitation light power P until the signal light power Psg reaches the target value Pth, and, maintaining the excitation light power after the signal light power Psg thus reaches the target value Pth.

Thus, by utilizing the characteristics of the scattered light power and reflected light power which change in different manners whether or not a harmful loss point occur, it is possible to effectively detect a harmful loss point so as to effectively avoid actual burning out of the optical transmission path material, according to the present invention. Accordingly, at a time of starting up in an actual field, connector joints having harmful loss points, i.e., loss points having large losses, are automatically detected, and, based on the thus-obtained detection result, a manner of controlling the excitation light power actually applied is determined before the plant starts commercial operation. Accordingly, it is possible to simplify starting up operation and also to achieve safe commercial operation.

Figure 11:
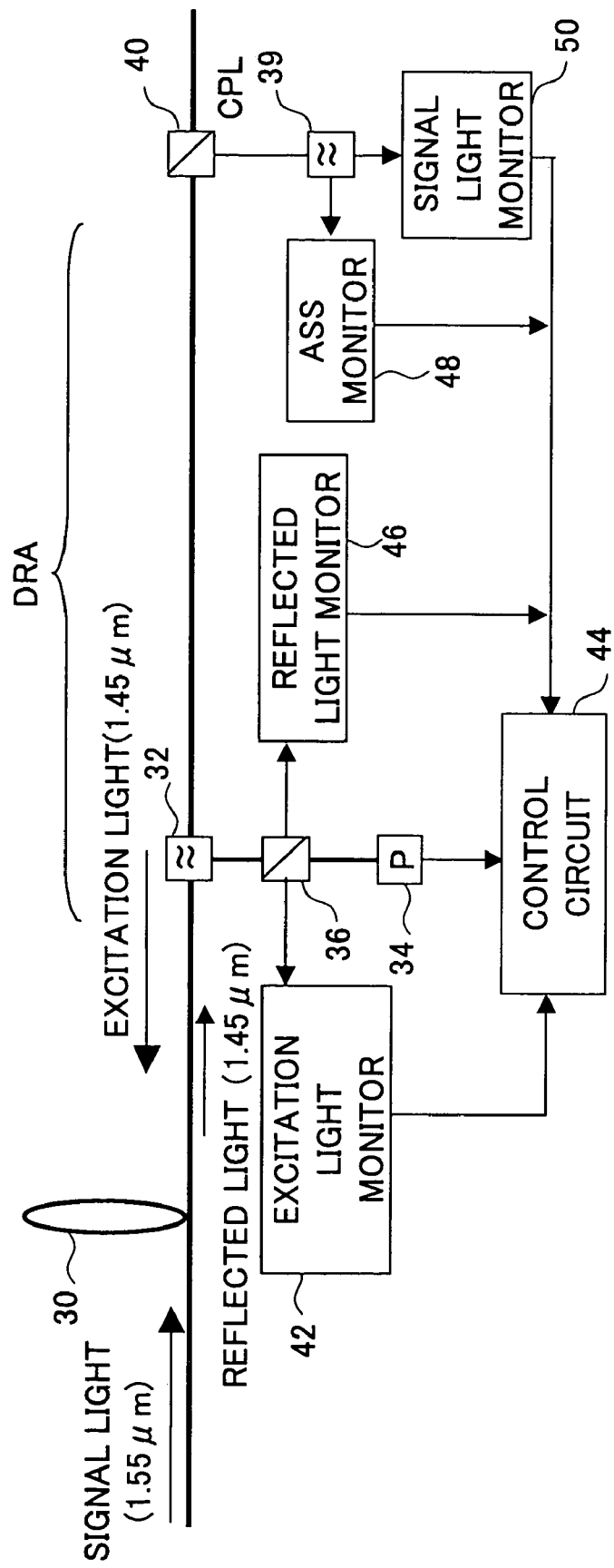
FIG. 11 shows a block diagram of a distributed Raman amplifier according to a second embodiment of the present invention.

FIG. 11 shows a block diagram of a distributed Raman amplifier according to a second embodiment of the present invention. In the figure, the same reference numeral is given to the same portion as that in FIG. 5. A point different from FIG. 5 is that a band separation optical coupler 39 is provided instead of the band separation optical coupler 38, in FIG. 11. In FIG. 11, through an optical fiber 30 which is an optical transmission path, a signal light for example with the wavelength of 1.55 µm is transmitted. This signal light is applied to the band separation optical coupler 32. An excitation light with the wavelength of 1.45 µm is supplied also to the band separation optical coupler 32 through an optical coupler 36 from an excitation light source 34, and, is applied, in a direction opposite to the transmission direction of the signal light, to the an optical fiber 30 with the band separation optical coupler 32.

Thereby, the signal light is amplified by using the optical fiber 30 as an amplifying medium. The signal light thus having undergone the optical amplification with the supply of the excitation light is then sent out to a subsequent optical fiber via an optical coupler 40.

In the optical coupler 36, while the excitation light supplied from the excitation light source 34 is separated, the reflected light in a direction opposite to that of the above-mentioned excitation light supplied from the band separation optical coupler 32 is also separated. The power of the excitation light is monitored by an excitation light monitor 42, and the thus-obtained monitoring signal is supplied to a control circuit 44, while the power of the reflected light is monitored by a reflected light monitor 46, and the thus-obtained monitoring signal is supplied to the control circuit 44.

Moreover, a scattered light and the signal light together separated with the optical coupler 40 from the optical fiber 30 are then separated into the scattered light and the signal light by the band separation optical coupler 39. Then, the power of the scattered light is monitored by the scattered light monitor 48, and the thus-obtained monitoring signal of the scattered light power is also supplied to the control circuit 44. Similarly, the power of the signal light is monitored by the signal light monitor 50, and the thus-obtained monitoring signal of th signal light power is supplied to the control circuit 44.

The control circuit 44 adjusts the excitation light power which originally the excitation light source 34 outputs, according to the thus-obtained monitoring signals of the excitation light power, reflected light power, scattered light power, and signal light power. Operation of the control circuit 44 is the same as that in the first embodiment described above, and the duplicated description thereof is omitted.

A control manner according to a third embodiment of the present invention in which the excitation light power control is performed not monitoring the reflected light power but monitoring the scattered light power will now be described. When a loss point exists in an optical transmission path, the scattered light power ASS is small. On the other hand, the scattered light power ASS is large when there is no loss point. By utilizing this behavior, the control is made referring to a relation between the excitation light power P and the scattered light power ASS.

Figure 12:
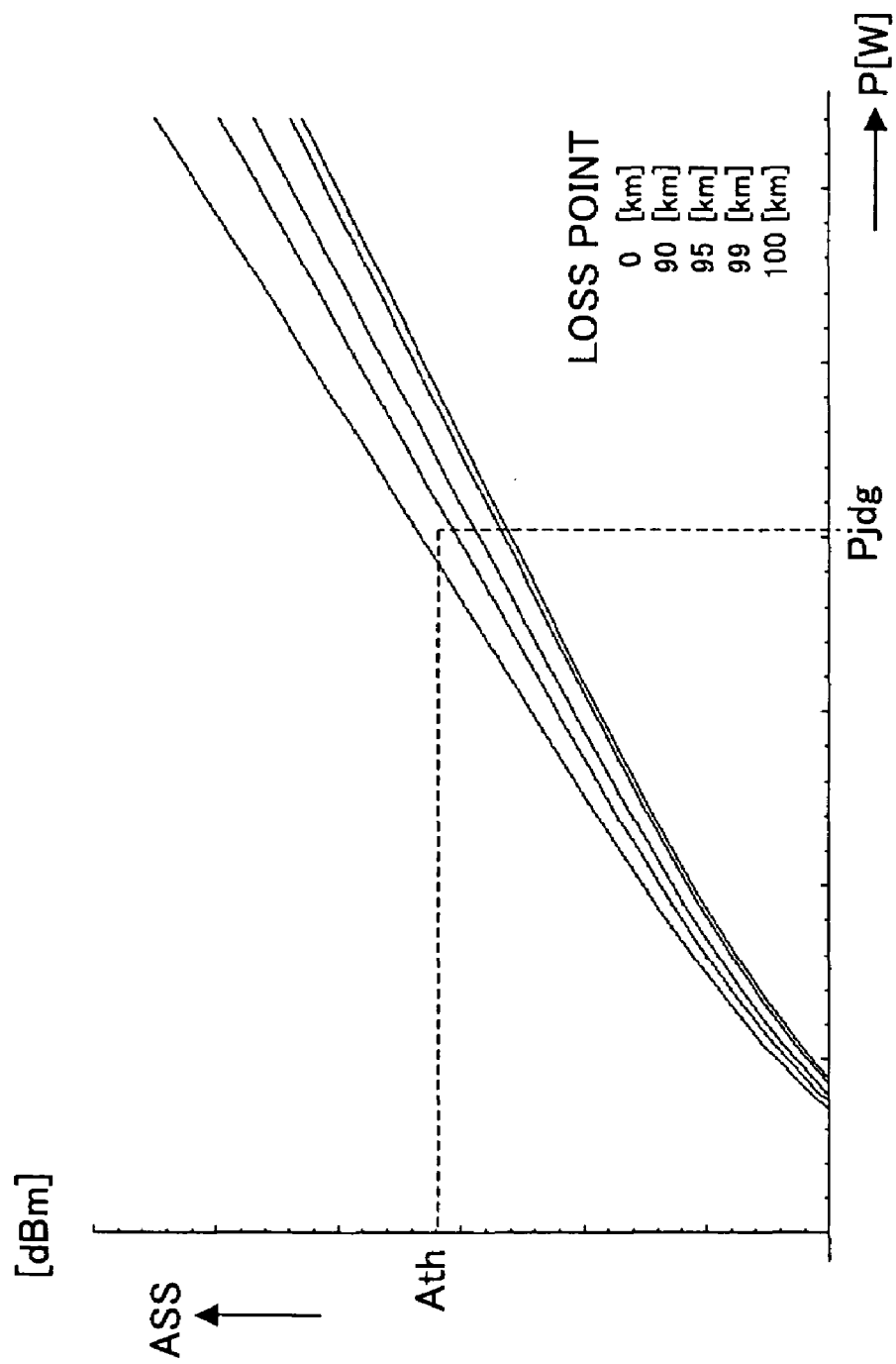
FIG. 12 illustrates a relation of the scattered light power ASS with respect to the applied excitation light power P.

FIG. 12 shows a relation of the scattered light power ASS with respect to the excitation light power P in case of setting the length of the optical fiber transmission path as 100 [km] and the loss at a loss point as 1 [dB]. The five curves shown in the figure show the relations in case the loss point is located at a position of 0 [km], 90 [km], 95 [km], 99 [km], and 100 [km] from the point at which the excitation light is applied, respectively.

A predetermined scattered light power is determined as a reference point Ath with application of a predetermined excitation light power Pjdg at a loss point between 0 [km] and 90 [km]. Then the excitation light power is raised at a fixed rate from 0. Then, in case where the scattered light power ASS does not reach the reference point Ath yet even when the excitation light power reaches Pjdg, it is determined that a loss point occurs. In this case, the control circuit 44 breaks the excitation light and generates an alarm. On the other hand, in case where the scattered light power ASS has already reached the reference point Ath when the excitation light power reaches Pjdg, it is determined that no loss point occurs. In this case, the control circuit 44 raises the excitation light power until the signal light power reaches a target value.

Figure 13:
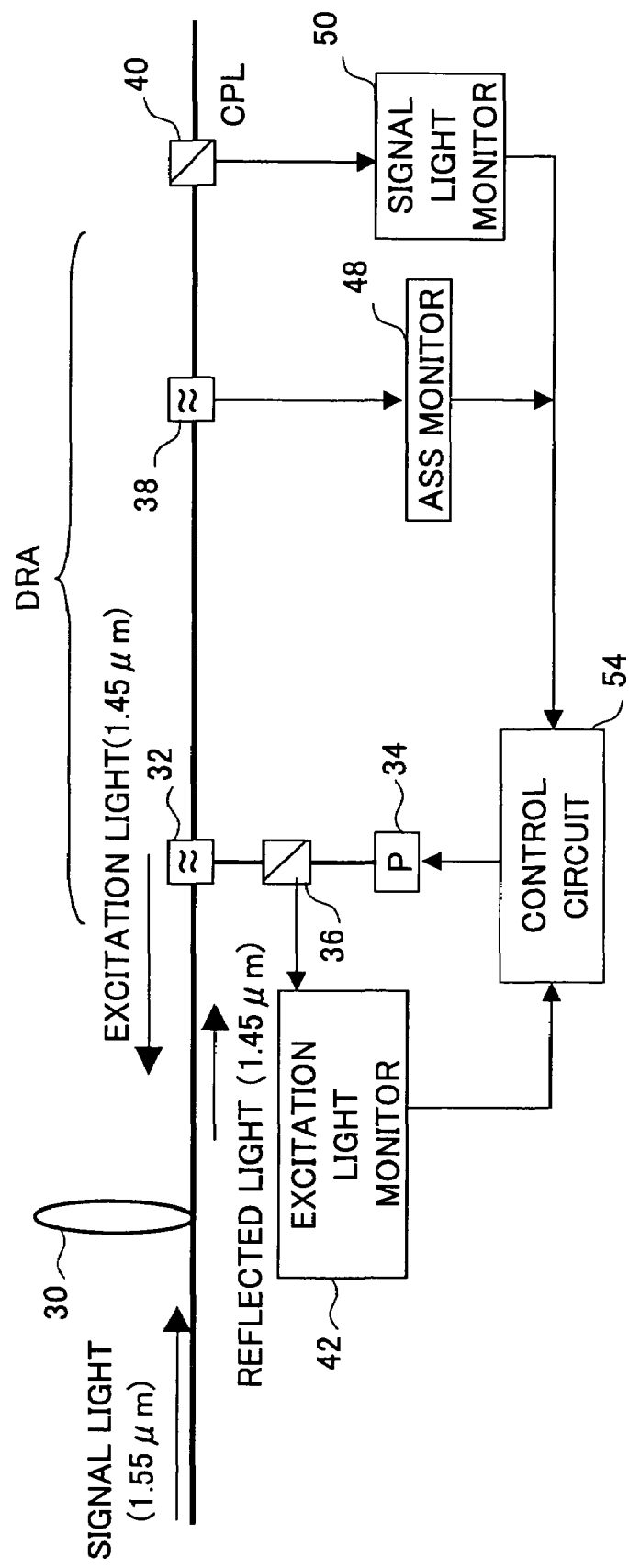
FIG. 13 shows a block diagram of a distributed Raman amplifier according to a third embodiment of the present invention.

FIG. 13 shows a block diagram of a distributed Raman amplifier according to the third embodiment of the present invention applying the above-described control scheme. The same reference numeral is given to the same portion as that in FIG. 5. In FIG. 13, through an optical fiber 30 which is an optical transmission path pass, a signal light for example with the wavelength of 1.55 µm is transmitted. This signal light is applied to a band separation optical coupler 32. An excitation light with the wavelength of 1.45 µm is supplied to the band separation optical coupler 32 through an optical coupler 36 from an excitation light source 34, and is applied in a direction opposite to the transmission direction of the signal light to the optical fiber 30 with the band separation optical coupler 32.

Thereby, the signal light is amplified by using the optical fiber 30 as an amplifying medium. The signal light thus having undergone the optical amplification with the supply of the excitation light is sent out to a subsequent optical fiber through a band separation optical coupler 38 and an optical coupler 40.

In the optical coupler 36, the excitation light supplied from the excitation light source 34 is separated. The power of the excitation light is monitored by an excitation light monitor 42, and the thus-obtained monitoring signal is supplied to a control circuit 54. The power of the scattered light separated with the band separation optical coupler 38 is also monitored by a scattered light monitor 48, and the thus-obtained monitoring signal of the scattered light power is also supplied to the control circuit 54. The power of the signal light separated with the optical coupler 40 is also monitored by a signal light monitor 50, and the thus-obtained monitoring signal of the signal light power is supplied to the control circuit 54.

The control circuit 54 adjusts the excitation light power which the excitation light source 34 originally outputs, according to the thus-obtained respective monitoring signals of the excitation light power, scattered light power, and signal light power. When operating the device (DRA), the control circuit 54 raises the excitation light power at a fixed rate from 0, and, when the excitation light power P reaches the predetermined determination value Pjdg but the scattered light power ASS has not arrived at the reference point Ath yet, the control circuit 54 determines that a loss point exists, and breaks the excitation light, with, for example, generating an alarm to a host apparatus, as mentioned above.

In case the scattered light power has already reached the reference point Ath when the excitation light power reaches Pjdg, the control circuit 54 determines that a loss point does not exist in the optical transmission path. Then, the control circuit 54 raises the excitation light power up to the target value Pth, and, after that, the control circuit 54 maintains the excitation light power P as mentioned above.

Thus, by monitoring the scattered light, and controlling the output of excitation light power accordingly, it becomes possible to prevent burning out at a loss point. Accordingly, at a time of starting up in an actual field, connector joints having harmful loss points, i.e., loss points having large losses, are automatically detected, and, based on the thus-obtained detection result, a manner of controlling the excitation light power actually applied is determined before the plant starts commercial operation. Accordingly, it is possible to simplify starting up operation and also to achieve safe commercial operation.

Figure 14:
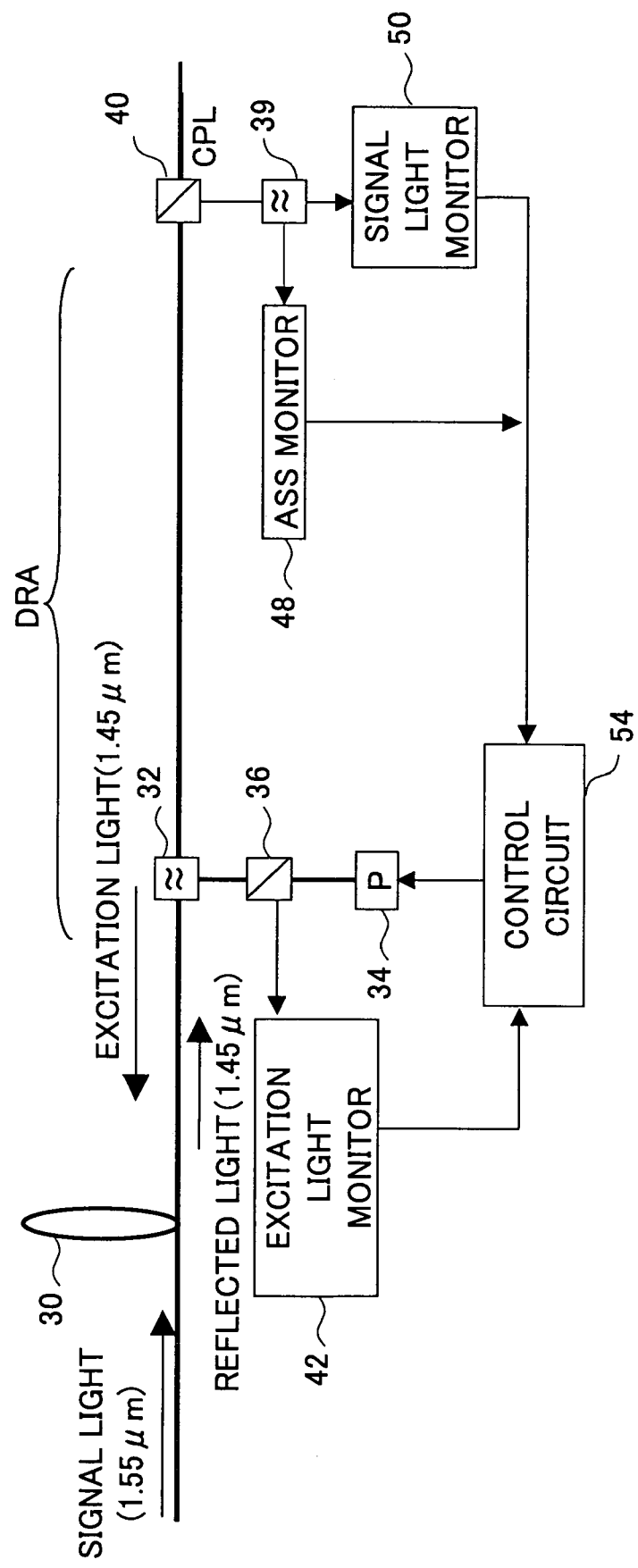
FIG. 14 shows a block diagram of a distributed Raman amplifier according to a fourth embodiment of the present invention.

FIG. 14 shows a block diagram of a distributed Raman amplifier according to a fourth embodiment of the present invention. The same reference numeral is given to the same portion as that in FIG. 13. Different from FIG. 13, the configuration shown in FIG. 14 includes a band separation optical coupler 39 provided instead of the band separation optical coupler 38. In FIG. 14, through an optical fiber 30 which is an optical transmission path pass, a signal light with the wavelength of 1.55 μm for example is transmitted. This signal light is applied to a band separation optical coupler 32. An excitation light with the wavelength of 1.45 μm is supplied also to the band separation optical coupler 32 through an optical coupler 36 from an excitation light source 34, and is applied in a direction opposite to the transmission direction of the signal light to the optical fiber 30 with the band separation optical coupler 32.

Thereby, the signal light is amplified with a use of the optical fiber 30 as an amplifying medium. The signal light thus having undergone the optical amplification with the supply of the excitation light is sent out to a subsequent optical fiber through an optical coupler 40.

In the optical coupler 36, the excitation light supplied from the excitation light source 34 is separated. Then the power of the excitation light monitored by an excitation light monitor 42, and the thus-obtained monitoring signal is supplied to a control circuit 54. The scattered light and signal light together separated with the optical coupler 40 are then separated into the scattered light and the signal light by the band separation optical coupler 39, and then, the power of the scattered light is monitored by a scattered light monitor 48, the thus-obtained monitoring signal of the scattered light power being then supplied to the control circuit 54. On the other hand, the power of the signal light is monitored by a signal light monitor 50, and the thus-obtained monitoring signal of the signal light power is supplied to the control circuit 54.

The control circuit 54 adjusts the excitation light power which the excitation light source 34 originally outputs, according to the thus-obtained respective monitoring signals of the excitation light power, scattered light power, and signal light power. Operation of the control circuit 54 is the same as that of the third embodiment described above, and the duplicated description is omitted.

The above-mentioned scattered light monitor 48 acts as a scattered-light monitoring part, the excitation light monitor 42 acts as an excitation-light monitoring part, the reflected light monitor 46 acts as a reflected-light monitoring part, the control circuit 44/54 acts as a determining part, the control circuit 44/54 also acts as a breaking part, the band separation optical coupler 38 acts as a first band separation optical coupler, and the band separation optical coupler 39 acts as a second band separation optical coupler.

The present invention is not limited to the above-described embodiments, and variations and modifications may be made without departing from the claimed scope of the present invention.

The present application is based on Japanese priority application No. 2002-322574, filed on Nov. 6, 2002, the entire contents of which are hereby incorporated by reference.

What is claimed is:

1. A loss point detecting method for determining whether or not a loss point occurs in an optical transmission path, in a distributed Raman amplifier which amplifies a signal light using the optical transmission path as an amplifying medium, by applying an excitation light to the optical transmission path in a first direction opposite to a second direction in which the signal light is transmitted through the optical transmission path, comprising:

monitoring power of scattered light separating from the optical transmission path;

separating part of the excitation light and monitoring power of the separated part of the excitation light;

separating a reflected light which passes in the second direction, opposite to the first direction in which the excitation light passes through the optical transmission path, and monitoring power of the separated, reflected light; and determining, when the monitored power of the separated part of the excitation light reaches a predetermined determination value, whether or not a loss point occurs, based on a ratio between the monitored power of the scattered light and the monitored power of the separated, reflected light.

2. A loss point detecting method for determining whether or not a loss point occurs in an optical transmission path, in a distributed Raman amplifier which amplifies a signal light, using the optical transmission path as an amplifying medium, by applying an excitation light to the optical transmission path in a first direction opposite to a second direction in which the signal light is transmitted through the optical transmission path, comprising:

monitoring power of scattered light separating from the optical transmission path;

separating part of the excitation light and monitoring the power of the separated part of the excitation light; and detemiining, when the monitored power of the excitation light reaches a predetermined determination value, whether or not a loss point occurs, based on the power of the monitored scattered light.

3. A distributed Raman amplifier which amplifies a signal light, using an optical transmission path as an amplifying medium, by applying an excitation light to the optical transmission path in a first direction opposite to a second direction in which the signal light is transmitted through the optical transmission path, comprising:

a scattered-light monitoring part monitoring power of scattered light separating from the optical transmission path;

an excitation-light monitoring part separating part of the excitation light and monitoring the power of the separated part of the excitation light;

a reflected-light monitoring part separating a reflected light which passes in the second direction, opposite to the first direction in which the excitation light passes through the optical transmission path, and monitoring the power of the separated, reflected light;

a determining part determining, when the monitored power of the excitation light reaches a predetermined determination value, whether or not any loss point occurs, based on a ratio between the monitored power of the scattered light and the monitored power of the reflected light; and a breaking part stopping the applying of the excitation light when said determining part determines that a loss point occurs.

4. A distributed Raman amplifier which amplifies a signal light, using an optical transmission path as an amplifying medium, by applying an excitation light to the optical transmission path in a first direction opposite to a second direction in which the signal light is transmitted through the optical transmission path, comprising:

a scattered-light monitoring part monitoring power of scattered light separating from the optical transmission path;

an excitation-light monitoring part separating part of the excitation light and monitoring the power of the separated part of the excitation light;

a reflected-light monitoring part separating a reflected light which passes in the second direction, opposite to the first direction in which the excitation light passes through the optical transmission path, and monitoring the power of the separated reflected light;

a determining part determining whether or not a loss point occurs, when increasing power of the excitation light at a fixed rate, and comparing a time required for the monitored power of the scattered light to reach a fixed value with a time required for the power of the monitored reflected light to reach a fixed value; and a breaking part stopping the application of the excitation light when said determining part determines that a loss point occurs.

5. A distributed Raman amplifier which amplifies a signal light, using an optical transmission path as an amplifying medium, by applying an excitation light to the optical transmission path in a first direction opposite to a second direction in which the signal light is transmitted through the optical transmission path, comprising:

a scattered-light monitoring pad monitoring power of scattered light separating from the optical transmission path;

an excitation-light monitoring part separating part of the excitation light and monitoring the power of the separated part of the excitation light;

a determining part determining, when the power of the monitored excitation light reaches a predetermined determination value, whether or not any loss point occurs, based on the monitored power of the scattered light; and a breaking part stopping the application of the excitation light when said determining part determines that a loss point occurs.

6. The distributed Raman amplifier as claimed in claim 3, wherein:

said determining part determines, when the power of the excitation light monitored reaches the predetermined determination value, that a loss point occurs when the ratio the power of the reflected light monitored with respect to the monitored power of the scattered light exceeds a predetermined value.

7. The distributed Raman amplifier as claimed in claim 3, further comprising:

a first band separating optical coupler separating only the scattered light from the optical transmission path.

8. The distributed Raman amplifier as claimed in claim 4, further comprising:

a first band separating optical coupler separating only the scattered light from the optical transmission path.

9. The distributed Raman amplifier as claimed in claim 5, further comprising:

a first band separating optical coupler separating only the scattered light from the optical transmission path.

10. The distributed Raman amplifier as claimed in claim 5, further comprising:

a second band separating optical coupler separating the scattered light from the signal light and scattered light separated from the optical transmission path by means of an optical coupler.

11. The distributed Raman amplifier as claimed in claim 6, further comprising:

a second band separating optical coupler separating the scattered light from the signal light and scattered light separated from the optical transmission path by means of an optical coupler.

12. The distributed Raman amplifier as claimed in claim 7, further comprising:

a second band separating optical coupler separating the scattered light from the signal light and scattered light separated from the optical transmission path by means of an optical coupler.

* * * * *

UNITED STATES PATENT AND TRADEMARK OFFICE
CERTIFICATE OF CORRECTION

PATENT NO. : 7,031,049 B2
APPLICATION NO. : 10/699698
DATED : April 18, 2006
INVENTOR(S) : Takashi Kamada et al.

It is certified that error appears in the above-identified patent and that said Letters Patent is hereby corrected as shown below:

Column 10, line 50, change "determiining" to --determining--

Column 11, line 29, after "separated" insert --,--

Column 11, line 45, change "pad" to --part--

Column 12, after "ratio" insert --of--

Signed and Sealed this

Fifteenth Day of August, 2006

JON W. DUDAS
*Director of the United States Patent and Trademark Office*